United States Patent

Zycha

[15] 3,697,153
[45] Oct. 10, 1972

[54] MULTILAYER OPTICAL INTERFERENCE FILTER WITH WIDEBAND SPECTRAL TRANSMISSION REGION AND REDUCED RIPPLE

[72] Inventor: Harald Zycha, Ampfing, Germany

[73] Assignee: Balzers Patent-und Beteiligungs-Aktiengesellshaft, Balzers, Furstentum, Liechtenstein

[22] Filed: Dec. 16, 1970

[21] Appl. No.: 98,786

[30] Foreign Application Priority Data

Dec. 17, 1969 Switzerland..............18884/69

[52] U.S. Cl. ......................350/166, 117/33.3, 350/1
[51] Int. Cl. ................................................G02b 5/28
[58] Field of Search...........................350/1, 163–166; 117/33.3

[56] References Cited

UNITED STATES PATENTS

| | | | |
|---|---|---|---|
| 3,410,625 | 11/1968 | Edwards | 350/166 |
| 3,528,726 | 9/1970 | Austin | 350/166 |
| 2,742,819 | 4/1956 | Koch et al. | 350/166 |

*Primary Examiner*—David Schonberg
*Assistant Examiner*—Toby H. Kusmer
*Attorney*—John J. McGlew and Alfred E. Page

[57] ABSTRACT

A multiple layer optical interference filter having a wideband spectral transmission region with reduced ripple structure is designed to reflect radiation of longer wavelengths. It comprises a carrier having an alternate system of layers of alternately high and low refractivity. Each of the layers are of an optical thickness which satisfies the relation $$n_i d_i \cos \alpha_i = \lambda_0/4$$

(where $n_i$ denotes the index of refraction of the layer substance, $d_i$ the thickness of the layer, the $\lambda_o$ the wavelength of the reflection region adjacent the long wave side to the transmission region of interest, and $\alpha_i$ the angle which is formed by the light ray passing through the filter and then normal to the layer plane of the layer in question). The system of layers comprises a light transparent equalizing layer adjacent to the outer one of said low reflectivity layers having a refractive index and having a thickness $d$ such that undesired secondary maxima of reflection are reduced. The thickness of the equalizing layer is equal to $d = 3 \cdot \lambda/8 \cdot 1/n \cos\alpha$. In this formula, $\lambda$ denotes the mean wavelength of the transmission region of interest to be smoothed. The letter $\alpha$ represents the angle which the light ray in the equalizing layer forms with the wavelength of the transmission region of interest to be smoothed. The index of refraction of the equalizing layer ($n$) is larger than the index of refraction of the low refractivity outer layer adjacent to the equalizing layer.

2 Claims, 4 Drawing Figures

MULTILAYER OPTICAL INTERFERENCE FILTER WITH WIDEBAND SPECTRAL TRANSMISSION REGION AND REDUCED RIPPLE

SUMMARY OF THE INVENTION

Optical interference filters are known which exhibit, on a light-transparent carrier, a system of thin, light-transparent layers of alternatingly high and low index of refraction, and wherein the layers of equal refraction among themselves have the same optical thickness. Optical thickness is understood here and in the following to be the product of layer thickness and index of refraction of the layer material. A system of this kind will be called in the following an alternating layer system.

As highly refractive layers are the following, for instance: $TiO_2$ ($n = 2.4$), $ZnS$ ($n = 2.3$) and other materials. For the low-refractive layers are frequently used $MgF_2$ ($n = 1.38$), $SiO_2$ ($n = 1.47$), etc. Such filters may find various applications; they are particularly used as so-called band pass and cutoff filters which allow light of given wavelength ranges to pass and which reflect or absorb the rest. For band pass and cutoff filters the requirement exists that the transmittivity in an extended, predetermined spectral region of interest should have a high value which is as uniform as possible. The graphically plotted transmission curve should exhibit a shape as smooth as possible in this range. This requirement cannot be met if one wishes to use in the design of the alternating layer system only optical layers of equal high or low refractivity (which would be desirable for manufacturing reasons). It is true that one can achieve by this a system in which the transmittivity becomes a maximum for certain wavelengths, but for adjacent wavelengths one must settle for more or less substantial deviations in the form of an interference-causing ripple structure. To reduce this undesirable ripple structure, various solutions have been proposed. For example, as disclosed in German Pat. No. 902,191 (Geffcken); The Journal of the Optical Society of America, 53, (1963) Nov. No. 11, p. 1266 to 70 (Thelen); The Journal of the Optical Society of America, 56, (1966) Nov., No. 11, p. 1533 to 38 (Thelen); and "Notes for Summer Course in Modern Methods of Optical Design," vol. 7, Multilayer Filters; Ed.: The Institute of Optics, University of Rochester (Baumeister), Germany, 1963.

An optical interference filter with reduced ripple structure has already been proposed for reflection or transmission which consists of a multiplicity of non-metallic layers, wherein an interference filter, designated as the inner system and having a ripple structure, is enclosed with optical symmetry by an outer system consisting of two outer groups. In the manufacture of an optical interference filter of this type care must be taken that the curve applicable for the reflection amplitude of the outer system shows practically the same shape in the region of wavelengths in question as that of the curve applicable for the root of the measurable reflection of the inner system. Meeting this requirement presents manufacturing problems of not inconsiderable magnitude. It is an object of the present invention to find a comparatively simple solution, compatible with the requirements of mass production, of the problem of smoothing the ripple structure of an optical interference filter, especially for the case of filters enclosed between glass plates.

The multilayer optical interference filter with a wideband spectral transmission region and reduced ripple structure, according to the invention, which is designed to reflect radiation of greater wave length and exhibits on a carrier an alternating system of alternate layers of high and low refractivity, wherein the layers are of optical thicknesses which satisfy the relation $n_i d_i \cos \alpha_i = \lambda_o/4$ (where $n_i$ designates the index of refraction of the layer substance, $d_i$ the thickness of the layer, $\lambda_o$ the wave length of the maximum of the reflection region adjacent on the long-wave side to the transmission region of interest, and $\alpha_i$ the angle formed by the light ray passing through the filter and the normal to the layer plane in the layer in question), and in which additionally there is provided a light transparent equalizing layer, adjacent to the low reflectivity outer layer of the alternating system, of such refractive index $n$ and such thickness $d$ that undesired secondary maxima of reflection are reduced, is characterized by that the thickness $d$ of the equalizing layer is equal to $$d = 3\lambda/8 \cdot 1/n \cos \alpha,$$

where $\lambda$ denotes the mean wave length of the transmission range of interest to be smoothed, and $\alpha$ the angle which the light ray in the equalizing layer forms with the normal to the latter.

Surprisingly it has been found that a substantial improvement of the transmission curve of an alternating layer system can be obtained with only a single equalizing layer of this type. The method of manufacturing is greatly simplified thereby. This single required equalizing layer can be arranged between the alternating layer system and the carrier or a cover glass, respectively, or on the system as the topmost layer, adjacent to the atmosphere.

The possibility to have the equalizing layer adjoin a glass carrier constitutes a particular advantage of the invention in the manufacture of optical interference filters, which should be enclosed hermetically between glass plates for protection against atmospheric influences.

Accordingly, it is an object of the invention to provide a multilayer optical interference filter having a wide band spectral transmission region and with reduced ripple structure.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE DRAWINGS

In the drawings,

FIG. 2b is a curve similar to FIG. 1b for the filter of the embodiment of FIG. 2a.

GENERAL DESCRIPTION OF THE PREFERRED EMBODIMENTS

Figure 1A:
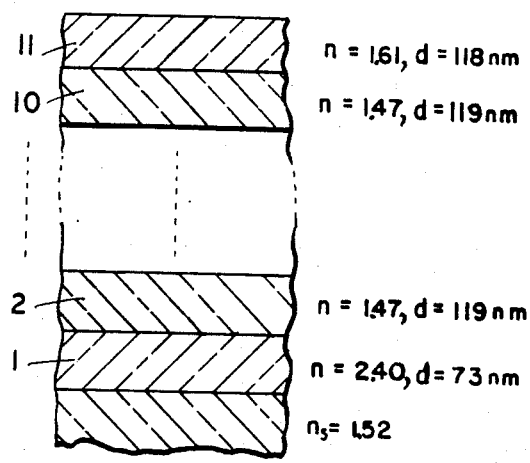
FIG. 1a is a cross sectional view of a filter constructed in accordance with the invention.
Figure 1B:
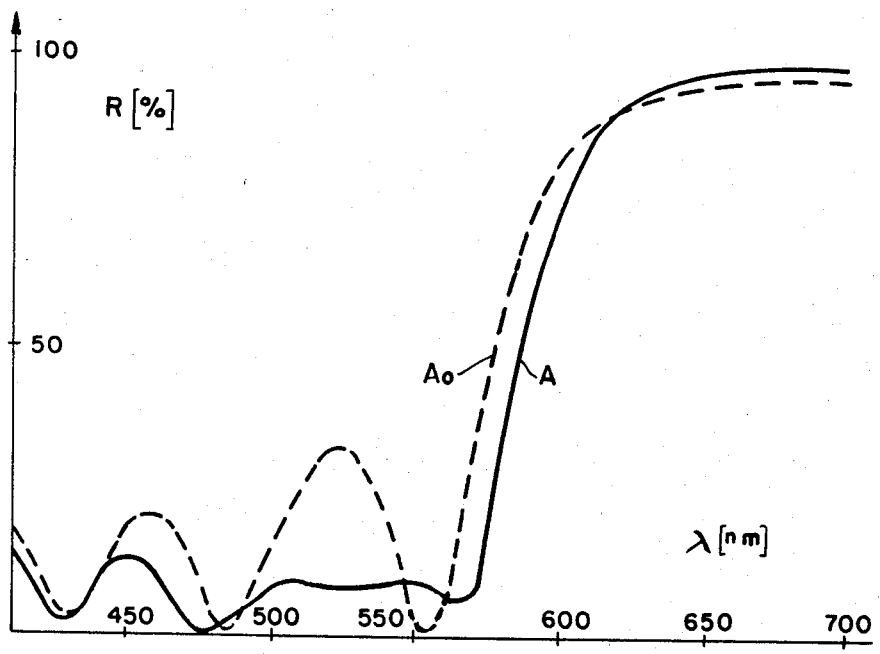
FIG. 1b is a curve indicating the dependency of the reflectivity of the filter of FIG. 1a on the wavelength.

As shown in FIG. 1, on a glass support with the index of refraction of 1.52 is applied first an optical interference filter system constructed periodically from 10 layers alternatingly of $TiO_2$ ($n = 2.4$) and $SiO_2$ ($n = 1.47$). The optical thickness of each of these 10 layers is one-quarter of the wavelength (700 nm) for which, in this example of implementation, a maximum of reflection is desired, or 175 nm. For such a system one obtains, as Curve A in FIG. 1b shows, a so-called cutoff edge, i.e., a steep rise of the reflection or drop of the transmission, respectively, between 560 and 610 nm. Thereupon follows a transmission region extending toward the shorter wavelengths, which, however, exhibits an undesirably pronounced ripple structure of transmission, i.e., several maxima and minima.

For the present cutoff filter the mean wave length of the region of interest is assumed to be about 505 nm, for example. According to the invention an equalizing layer was therefore applied as an eleventh layer on the system consisting of ten layers, the optical thickness of which is three-eighths of 505, or approximately 190 nm.

The value of the index of refraction of the equalizing layer 11 is not difficult to determine by preliminary tests; it must be larger than the value of the index of refraction of the low-refractivity layer adjoining it of the alternating system. In the present example an equalizing layer of $Al_2O_3$ was chosen which can be evaporated on with an index of refraction of 1.61 in vacuum, but any other substance can also be used as the equalizing layer which can be evaporated on as a stable, light transparent layer with the lowest possible absorption with the prescribed thickness, preferably in vacuum, as long as it exhibits the proper index of refraction. The solid curve A of FIG. 1b shows the effect of the equalizing layer; as can be seen, the strong fluctuation in the transmission region is substantially reduced.

Figure 2A:
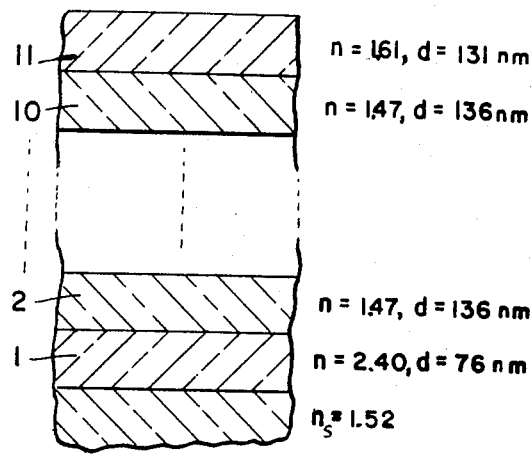
FIG. 2a is a view similar to FIG. 1a of another embodiment of the invention.
Figure 2B:
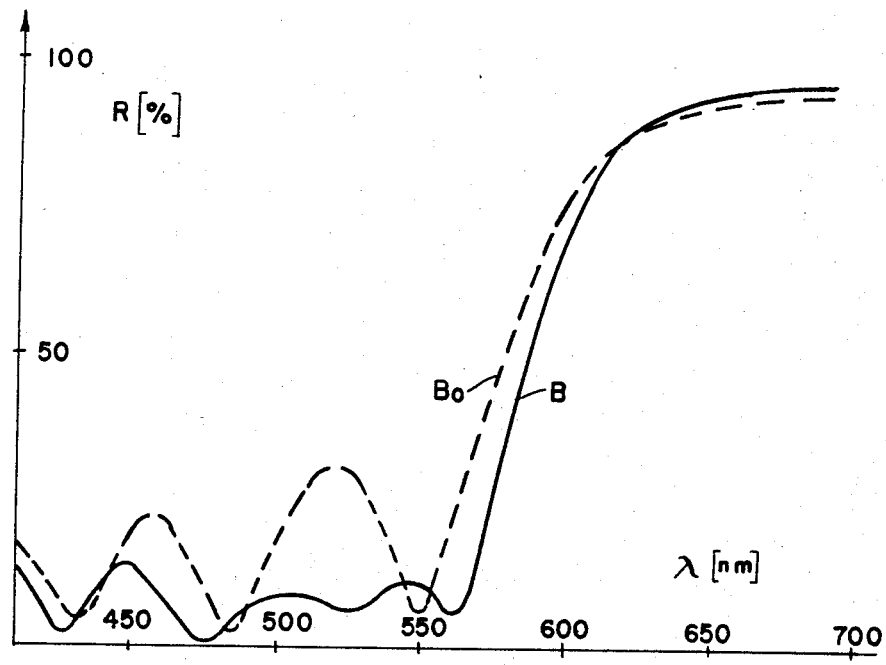

While the example of FIG. 1a is laid out for normal light incidence on the filter, FIG. 2a shows a filter which is intended for a light incidence angle of 45°. FIG. 2a shows the design of this second example of implementation. On the glass carrier is again applied an alternating system of ten layers of $TiO_2$ and $SiO_2$. The thickness of these layers is calculated according to the formula above. The resulting layer thicknesses are plotted in FIG. 2a. The transmission curve $B_o$ of this system without equalizing layer is shown in FIG. 2b. Also here strong periodic fluctuations are present in the transmission region which, according to the invention, can be reduced by a single additional layer. This additional layer again consists of $Al_2O_3$ and its thickness is calculated according to the formula above as 131 nm if 505 nm is again assumed as the mean wavelength of the transmission region.

The advantageous effect of the equalizing layer in this second example of implementation is shown in the solid curve B in FIG. 2b. A substantial reduction of the undesired fluctuations is noted here also. The layer thicknesses for other incidence angles can be calculated in a manner analogous to a light incidence angle of 45° to the filter. The angle of the light ray in each individual layer is obtained on the basis of the well-known refraction law.

While specific embodiments of the invention have been shown and described in detail to illustrate the application of the principles of the invention, it will be understood that the invention may be embodied otherwise without departing from such principles.

What is claimed is:

1. A multiple layer optical interference filter with a wideband spectral transmission region with reduced ripple structure and which is designed to reflect radiation of longer wave lengths, comprising a carrier having an alternating system of layers of alternatingly high and low refractivity, said layers being of an optical thickness which satisfies the relation $$n_i d_i \cos \alpha_i = \lambda_0/4$$

(where $n_i$ denotes the index of refraction of the layer substance, $d_i$ the thickness of the layer, $\lambda_o$ the wavelength of the reflection adjacent the long wave side to the transmission region of interest, and $\alpha_i$ the angle which is formed by the light ray passing through the filter and the normal to the layer plane of the layer in question), said system of layers comprising a light transparent equalizing layer adjacent to the outer of said low reflectivity layers of such refractive index ($n$) and such thickness ($d$) that undesired secondary maxima of reflection are reduced, and wherein the thickness ($d$) of the equalizing layer is equal to $d = 3\lambda/8 \cdot 1/n \cos \alpha$, where $\lambda$ denotes the mean wave length of the transmission region of interest to be smoothed, and $\alpha$ the angle which the light ray in the equalizing layer forms with the mean wave length; and wherein the index of refraction ($n$) of the equalizing layer is larger than the index of refraction of the low refractivity outer layer adjacent to said equalizing layer.

2. A multiple layer optical interference filter according to claim 1 characterized in that the equalizing layer is arranged between a glass plate and the alternating layer system.

* * * * *